(12) United States Patent
Nitta et al.

(10) Patent No.: US 11,428,901 B2
(45) Date of Patent: Aug. 30, 2022

(54) CAMERA LENS OF CATADIOPTRIC OPTICAL SYSTEM

(71) Applicant: AAC Optics Solutions Pte. Ltd., Singapore (SG)

(72) Inventors: Koji Nitta, Osaka (JP); Kaoru Yamazaki, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/901,002

(22) Filed: Jun. 15, 2020

(65) Prior Publication Data

US 2021/0364740 A1 Nov. 25, 2021

(30) Foreign Application Priority Data

May 21, 2020 (JP) .............................. JP2020-088998

(51) Int. Cl.
| | |
|---|---|
| *G02B 13/00* | (2006.01) |
| *G02B 9/12* | (2006.01) |
| *G02B 27/00* | (2006.01) |
| *G02B 17/08* | (2006.01) |

(52) U.S. Cl.
CPC ........... *G02B 13/0035* (2013.01); *G02B 9/12* (2013.01); *G02B 17/0856* (2013.01); *G02B 27/0025* (2013.01)

(58) Field of Classification Search
CPC ...................... G02B 13/0035; G02B 17/0856; G02B 17/08; G03B 9/12
See application file for complete search history.

(56) References Cited

U.S. PATENT DOCUMENTS

| | | | |
|---|---|---|---|
| 2013/0010376 A1* | 1/2013 | Hatakeyama | G02B 17/0804 359/731 |
| 2014/0049841 A1* | 2/2014 | Ryu | G02B 17/0808 359/745 |
| 2018/0252905 A1* | 9/2018 | Dainty | G02B 17/004 |

* cited by examiner

*Primary Examiner* — Alicia M Harrington
(74) *Attorney, Agent, or Firm* — W&G Law Group

(57) ABSTRACT

Provided is a camera lens of a catadioptric optical system consisting of two lens assemblies and one lens and having a small height, a narrow angle, and good optical properties. The camera lens includes: a first lens assembly including an object side surface having a first refractive surface and a second reflective surface in a peripheral region and a central region thereof, and an image side surface having a second refractive surface, a fifth refractive surface and a sixth refractive surface that are sequentially arranged from a peripheral region to a central region thereof; a second lens assembly including an object side surface having a third refractive surface and a fourth refractive surface that are sequentially arranged from a peripheral region to a central region, and an image side surface having a first reflective surface; and a third lens having a refractive power.

7 Claims, 12 Drawing Sheets

CAMERA LENS OF CATADIOPTRIC OPTICAL SYSTEM

TECHNICAL FIELD

The present invention relates to the optical lens field, and particularly, to a camera lens related to a narrow-angle lens of a miniature catadioptric optical system.

BACKGROUND

In recent years, various imaging devices using imaging elements such as CCDs and CMOSs have been widely applied. With the development of miniaturization and high performance of these imaging elements, it is urgent to develop a camera lens of a catadioptric optical system with a small height, a narrow angle, and good optical properties.

The technologies in terms of the camera lens of the catadioptric optical system having a small height, a narrow angle, and good optical properties are driven to be developed. As a camera lens of the catadioptric optical system, a camera lens is provided to include a first lens and a second lens that are arranged from an object side and separated by an air gap. A first refractive surface is formed in a peripheral region of an object side surface of the first lens, and a second reflective surface is formed in a central region of the object side surface of the first lens. A first reflective surface is formed in a peripheral region of an image side surface of the second lens, and a second refractive surface is formed in a central region of the image side surface of the second lens.

In an existing camera lens of a catadioptric optical system, the peripheral region of the second lens and the central region of the second lens are formed into one piece. Since the refractive index of the central region of the second lens and ratios of Abbe numbers of the peripheral area of the first and second lenses and an Abbe number of the central area of the second lens are insufficient, a field of view angle is greater than or equal to 21.4°, and the angle is not narrow enough.

SUMMARY

A purpose of the present invention is to provide a camera lens of a catadioptric optical system having a small height, a narrow angle, and good optical properties. The camera lens is consisted of two lens assemblies and one lens.

For the above purpose, the applicant has intensively studied a refractive index of a third lens and ratios of an abbe number of a first lens assembly, an abbe number of a second lens assembly and an abbe number of the third lens, and has obtained a camera lens of a catadioptric optical system of the present invention which can solve the technical problems in the related art.

A camera lens according to a first technical solution includes, sequentially from an object side, a first lens assembly having a reflective power and a refractive power, wherein an object side surface of the first lens assembly includes a first refractive surface in a peripheral region thereof and a second reflective surface in a central region thereof, and an image side surface of the first lens assembly includes a second refractive surface, a fifth refractive surface and a sixth refractive surface that are sequentially arranged from a peripheral region to a central region thereof; a second lens assembly having a reflective power and a refractive power, wherein an object side surface of the second lens assembly includes a third refractive surface and a fourth refractive surface that are sequentially arranged from a peripheral region to a central region thereof, and an image side surface of the second lens assembly includes a first reflective surface; and a third lens having a refractive power. The camera lens satisfies following conditions:

$$1.68 \leq nd3 \leq 1.91; \text{ and}$$

$$3.50 \leq (v1+v2)/v3 \leq 6.00,$$

where
nd3 denotes a refractive index of d line of the third lens;
v1 denotes an abbe number of the first lens assembly;
v2 denotes an abbe number of the second lens assembly; and
v3 denotes an abbe number of the third lens.

The camera lens according to a second technical solution further satisfies a following condition:

$$0.70 \leq (|R3|+R4|)/f \leq 1.20,$$

$$4.00 \leq (d1+d3)/d2 \leq 12.00,$$

where
f denotes a focal length of the camera lens;
R3 denotes an on-axis curvature radius of the third refractive surface; and
R4 denotes an on-axis curvature radius of the first reflective surface.

The camera lens according to a third technical solution further satisfies a following condition:

$$0.90 \leq (|R7|+|R8|)/f \leq 4.00,$$

where
f denotes a focal length of the camera lens;
R7 denotes an on-axis curvature radius of the second reflective surface; and
R8 denotes an on-axis curvature radius of the sixth refractive surface.

The camera lens according to a fourth technical solution further satisfies following conditions:

$$-1.20 \leq nd3/R9 \leq -0.70; \text{ and}$$

$$-0.60 \leq nd3/R10 \leq -0.53,$$

where
R9 denotes an on-axis curvature radius of the seventh refractive surface; and
R10 denotes an on-axis curvature radius of the eighth refractive surface.

The camera lens according to a fifth technical solution further satisfies a following condition:

$$-0.95 \leq TTL/f3 \leq 0.00,$$

where
TTL denotes an optical length indicating an on-axis distance from the second reflective surface to an image plane; and
f3 denotes a focal length of the third lens.

The camera lens according to a sixth technical solution further satisfies a following condition:

$$0.18 \leq TTL/f \leq 0.45,$$

where
TTL denotes an optical length indicating an on-axis distance from the second reflective surface to an image plane; and
f denotes a focal length of the camera lens.

The camera lens according to a seventh technical solution further satisfies a following condition:

$$2.20 \leq TTL/IH \leq 2.70,$$

where

TTL denotes an optical length indicating an on-axis distance from the second reflective surface to an image plane; and IH denotes a maximum image height.

The camera lens according to an eighth technical solution further satisfies a following condition that the first lens assembly, the second lens assembly and the third lens assembly are each made of glass.

Technical Effects

According to the present invention, an optical path of a catadioptric optical system consisted of a first lens assembly, a second lens assembly and a third lens and being coaxial twice is configured in such a manner that the diffraction limit of the lens is improved, telephoto is achieved, and a small and compact narrow-angle lens is achieved. The present invention provides a camera lens, which consists of two lens assemblies and one lens, is suitable for portable module cameras that adopt high-pixel CCD, CMOS, or other imaging elements, has a small height, guarantees a narrow angle, and also has good optical properties.

DESCRIPTION OF EMBODIMENTS

Figure 1:
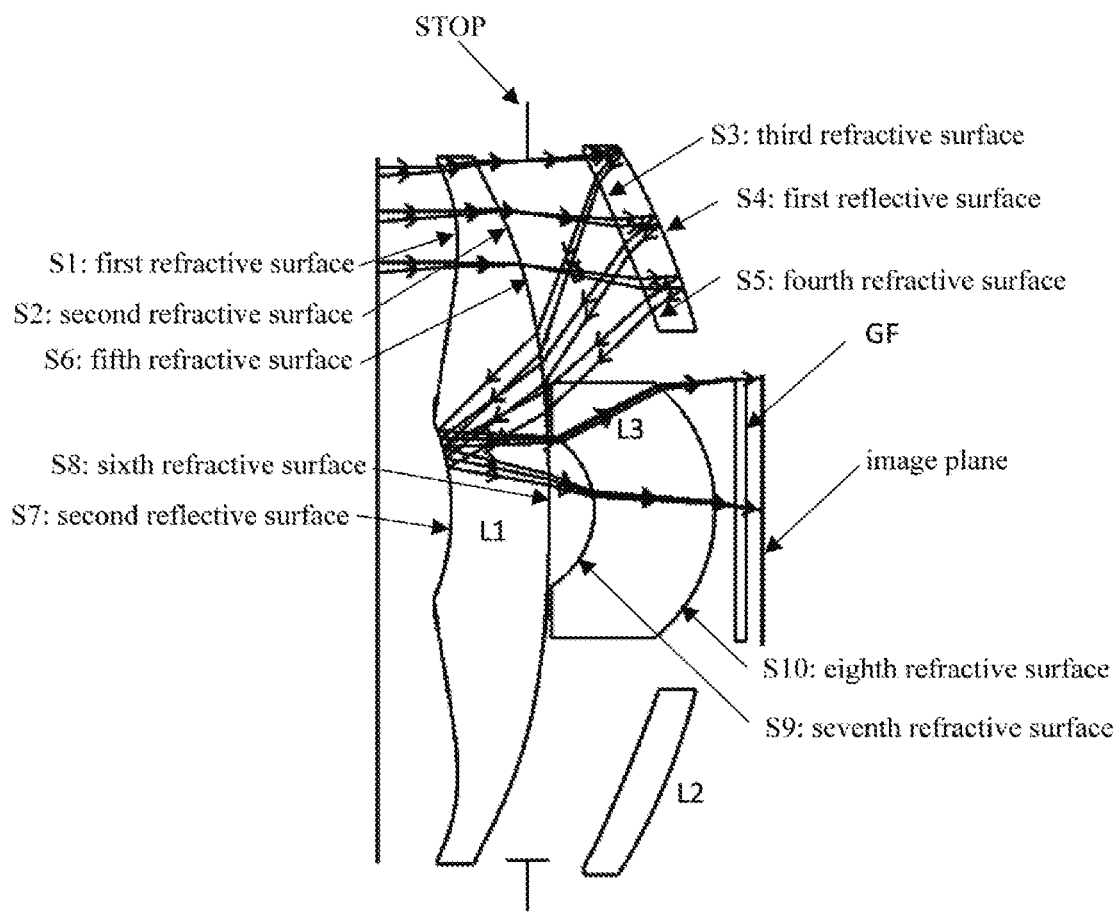
FIG. 1 is a schematic diagram of a camera lens LA according to a first embodiment of the present invention.

The embodiments of the camera lens of the catadioptric optical system according to the present invention will be described below. The camera lens LA of the catadioptric optical system is provided with a lens system. The lens system includes a first lens assembly L1, a second lens assembly L2 and a third lens L3 (i.e., two lens assemblies and one lens) that are arranged from an object side to an image side. A glass plate GF is arranged between the third lens L3 and an image plane. A cover glass plate and various filters can be considered as the glass plate GF. In the present invention, the glass plate GF may be arranged at different positions, or may also be omitted.

The camera lens includes a first lens assembly L1 having a reflective power and a refractive power, a second lens assembly L2 having a reflective power and a refractive power, and a third lens L3 having a refractive power. An object side surface of the first lens assembly L1 includes a first refractive surface S1 in its peripheral region and a second reflective surface S7 in its central region. An image side surface of the first lens assembly L1 includes a second refractive surface S2, a fifth refractive surface S6 and a sixth refractive surface S8 that are sequentially arranged from its peripheral region to its central region. An object side surface of the second lens assembly L2 includes a third refractive surface S3 and a fourth refractive surface S5 that are sequentially arranged from its peripheral region to its central region, and an image side surface of the second lens assembly L2 includes a first reflective surface S4. An object side surface of the third lens L3 includes a seventh refractive surface S9, and an image side surface of the third lens L3 includes an eighth refractive surface S10. In order to correct various aberrations, it is desirable to design all surfaces of these two lens assemblies and one lens as aspherical surfaces.

Herein, the central region refers to a region around a center of a lens surface, which is an optical axis of the lens, and the peripheral region refers to a region of the lens surface excluding the central region, i.e., a region around a periphery of the lens surface.

Light incident to the first refractive surface S1 passes through the second refractive surface S2 and the third refractive surface S3 sequentially, and then is reflected by the first reflective surface S4. After that, the light passes through the fourth refractive surface S5 and the fifth refractive surface S6 and is then incident to the second reflective surface S7, and after being reflected by the second reflective surface S7, the light passes through the sixth refractive surface S8 and then is incident to the third lens L3.

In an example, the first lens assembly L1 is of a unibody structure, and the second lens assembly L2 is of a unibody structure. In another example, at least one of the first lens assembly and the second lens assembly may be a cemented lens.

In an example, the first lens assembly L1 is made of glass, the second lens assembly L2 is made of glass, and the third lens L3 is made of glass.

The camera lens LA of the catadioptric optical system satisfies the following conditions (1) to (2):

$$1.68 \leq nd3 \leq 1.91 \quad (1); \text{ and}$$

$$3.50 \leq (v1+v2)/v3 \leq 6.00 \quad (2),$$

where nd3 denotes a refractive index of d line of the third lens L3;

v1 denotes an abbe number of the first lens assembly L1;

v2 denotes an abbe number of the second lens assembly L2; and v3 denotes an abbe number of the third lens L3.

The condition (1) specifies the refractive index of the third lens L3. If it is outside the range of condition (1), it is difficult to achieve a narrow angle and a small height with good optical properties, which is not preferable.

The condition (2) specifies the abbe numbers of the first lens assembly, the second lens assembly and the third lens L3. If it is outside the range of condition (2), a correction of aberrations becomes difficult, which is not preferable.

The second lens assembly L2 satisfies the following condition (3):

$$0.70 \le (|R3|+|R4|)/f \le 1.20 \qquad (3),$$

where f denotes a focal length of the camera lens LA of the catadioptric optical system;
R3 denotes a curvature radius of the third refractive surface; and
R4 denotes a curvature radius of the first reflective surface.

The condition (3) specifies a ratio of a curvature radius of the second lens assembly L2 to the focal length. If it is within the range of condition (3), a camera lens having a small height, a narrow angle, and good optical properties can be easily achieved, which is preferable.

The first lens assembly L1 satisfies the following condition (4):

$$0.90 \le (|R7|+|R8|)/f \le 4.00 \qquad (4),$$

where R7 denotes a curvature radius of the second reflective surface; and
R8 denotes a curvature radius of the sixth refractive surface.

The condition (4) specifies a ratio of a curvature radius of the first lens assembly L1 to the focal length. If it is within the range of condition (4), a camera lens having a small height, a narrow angle, and good optical properties can be easily achieved, which is preferable.

The third lens L3 satisfies the following conditions (5) and (6):

$$-1.20 \le nd3/R9 \le -0.70 \qquad (5); \text{ and}$$

$$-0.60 \le nd3/R10 \le -0.53 \qquad (6),$$

where R9 denotes a curvature radius of the seventh refractive surface; and
R10 denotes a curvature radius of the eighth refractive surface.

The condition (5) specifies a ratio of the refractive index of the third lens L3 to the curvature radius of the seventh refractive surface. If it is within the range of condition (5), a camera lens having a small height, a narrow angle, and good optical properties can be easily achieved, which is preferable.

The condition (6) specifies a ratio of the refractive index of the third lens L3 to the curvature radius of the eighth refractive surface. If it is within the range of condition (6), a camera lens having a small height, a narrow angle, and good optical properties can be easily achieved, which is preferable.

The camera lens LA of the catadioptric optical system satisfies the following condition (7):

$$-0.95 \le TTL/f3 \le 0.00 \qquad (7),$$

where TTL denotes an optical length (an on-axis distance from the second reflective surface to an image plane); and
f3 denotes a focal length of the third lens L3.

The condition (7) specifies a ratio of the optical length to the focal length of the third lens L3. If it is below an upper limit of the condition (7), a narrow angle can be easily achieved. If it is above a lower limit of the condition (7), corrections of a spherical aberration and a coma can be easily achieved. Thus, the condition (7) is preferable.

The camera lens LA of the catadioptric optical system satisfies the following condition (8):

$$0.18 \le TTL/f \le 0.45 \qquad (8).$$

The condition (8) specifies a ratio of the optical length to the focal length of the camera lens LA. If it is below an upper limit of the condition (8), a narrow angle can be easily achieved. If it is above a lower limit of the condition (8), corrections of a spherical aberration and a coma can be easily achieved. Thus, the condition (8) is preferable.

The camera lens LA of the catadioptric optical system satisfies the following condition (9):

$$2.20 \le TTL/IH \le 2.70 \qquad (9),$$

where IH denotes a maximum image height.

The condition (9) specifies a ratio of the optical length to the maximum image height. If it is below an upper limit of the condition (9), a low height can be achieved to a great extent for the optical length with respect to the image height. If it is above a lower limit of the condition (9), corrections of a spherical aberration and a coma can be easily achieved. Thus, the condition (9) is preferable.

The two lens assemblies and one lens of the camera lens LA satisfy the above construction and conditions, so as to obtain the camera lens consisting of two lens assemblies and one lens and having a small height, a narrow angle, and good optical properties.

EMBODIMENTS

The camera lens LA of the catadioptric optical system according to the present invention will be described with reference to the embodiments below. The reference signs described in the embodiments are listed below. In addition, the distance, radius and center thickness are all in a unit of mm.

f: focal length of the camera lens LA of the catadioptric optical system;
f3: focal length of the third lens L3;
Fno: F number;
2ω: full field of view;
STOP: aperture;
R: curvature radius of an optical surface, a central curvature radius for a lens;
R1: curvature radius of the first refractive surface S1;
R2: curvature radius of the second refractive surface S2;
R3: curvature radius of the third refractive surface S3;
R4: curvature radius of the first reflective surface S4;
R5: curvature radius of the fourth refractive surface S5;
R6: curvature radius of the fifth refractive surface S6;
R7: curvature radius of the second reflective surface S7;
R8: curvature radius of the sixth refractive surface S8;
R9: curvature radius of the seventh refractive surface S9;
R10: curvature radius of the eighth refractive surface S10;
R11: curvature radius of an object side surface of the glass plate GF;
R12: curvature radius of an image side surface of the glass plate GF;
d: center thickness of a lens or distance between lenses;
d1: on-axis center thickness from the first refractive surface S1 to the second refractive surface S2;
d2: on-axis distance from the second refractive surface S2 to the aperture STOP;
d3: on-axis distance from the aperture STOP to the third refractive surface S3;
d4: on-axis center thickness from the third refractive surface S3 to the first reflective surface S4;
d5: on-axis center thickness from the first reflective surface S4 to the fourth refractive surface S5;

d6: on-axis distance from the fourth refractive surface S5 to the fifth refractive surface S6;

d7: on-axis center thickness from the fifth refractive surface S6 to the second reflective surface S7;

d8: on-axis center thickness from the second reflective surface S7 to the sixth refractive surface S8;

d9: on-axis distance from the sixth refractive surface S8 to the seventh refractive surface S9;

d10: on-axis center thickness from the seventh refractive surface S9 to the eighth refractive surface S10;

d11: on-axis distance from the eighth refractive surface S10 to an object side surface S11 of the glass plate GF;

d12: center thickness of the glass plate GF;

d13: on-axis distance from an image side surface S12 of the glass plate GF to the image plane;

nd: refractive index of d line;

nd1: refractive index of d line of the first lens assembly L1;

nd2: refractive index of d line of the second lens assembly L2;

nd3: refractive index of d line of the third lens L3;

ndg: refractive index of d line of the glass plate GF;

v: abbe number;

v1: abbe number of the first lens assembly L1;

v2: abbe number of the second lens assembly L2;

v3: abbe number of the third lens L3;

vg: abbe number of the glass plate GF;

TTL: total optical length (on-axis distance from the second reflective surface S7 to the image plane);

LB: on-axis distance from the eighth refractive surface S10 to the image plane (including a thickness of the glass plate GF); and IH: maximum image height.

$$Y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (10)$$

For convenience, the aspheric surface of each lens surface uses the aspheric surface defined in the equation (10). However, the present invention is not limited to the aspherical polynomial defined in the equation (10).

First Embodiment

FIG. 1 is a schematic diagram of a camera lens LA of a catadioptric optical system according to a first embodiment of the present invention. The curvature radiuses R of the reflective surfaces and refractive surfaces of the first lens assembly L1 to the glass plate GF of the camera lens LA of the catadioptric optical system according to the first embodiment, the center thicknesses of the lenses, or distances d between the lenses, refractive indexes nd, Abbe numbers v are shown in Table 1; conic coefficients k and aspheric coefficients are shown in Table 2; and 2ω, Fno, f, f3, TTL, LB, and IH are shown in Table 3.

TABLE 1

|  |  | R | d |  | nd |  | vd | Effective radius (mm) |
|---|---|---|---|---|---|---|---|---|
| S1 | R1 | 14.04449 | d1 | 2.345 | nd1 | 1.4970 | v1 | 81.55 | 6.819 |
| S2 | R2 | −34.04927 | d2 | −0.429 |  |  |  |  | 6.895 |
| STOP |  | ∞ | d3 | 3.183 |  |  |  |  | 6.823 |
| S3 | R3 | −9.74909 | d4 | 0.551 | nd2 | 1.5163 | v2 | 64.07 | 6.943 |
| S4 | R4 | −14.02595 | d5 | −0.551 |  |  |  |  | 7.106 |
| S5 | R5 | −9.74909 | d6 | −2.754 |  |  |  |  | 6.943 |
| S6 | R6 | −34.04927 | d7 | −1.908 | nd1 | 1.4970 | v1 | 81.55 | 3.530 |
| S7 | R7 | −5.12324 | d8 | 1.908 |  |  |  |  | 1.710 |
| S8 | R8 | −34.04927 | d9 | 0.877 |  |  |  |  | 1.515 |
| S9 | R9 | −1.69959 | d10 | 2.348 | nd3 | 1.9020 | v3 | 25.10 | 1.480 |
| S10 | R10 | −3.46228 | d11 | 0.400 |  |  |  |  | 2.500 |
| S11 | R11 | ∞ | d12 | 0.210 | ndg | 1.5168 | vg | 64.17 | 2.645 |
| S12 | R12 | ∞ | d13 | 0.320 |  |  |  |  | 2.657 |

Reference wavelength = 588 nm

TABLE 2

|  | Conic coefficient | Aspherical coefficient | | | |
|---|---|---|---|---|---|
|  | k | A4 | A6 | A8 | A10 |
| S1 | −1.8705E+01 | 4.1180E−04 | −3.7250E−05 | 1.2033E−06 | −1.6594E−08 |
| S2 | 4.5554E+00 | −5.1446E−04 | 1.4524E−05 | −6.4425E−07 | 1.5148E−08 |
| S3 | −4.7820E−01 | −6.3653E−05 | 2.6534E−05 | −1.1628E−06 | 3.1736E−08 |
| S4 | 2.6971E−01 | −1.0188E−05 | −3.3581E−07 | 3.3776E−07 | −3.1263E−08 |
| S5 | −4.7820E−01 | −6.3653E−05 | 2.6534E−05 | −1.1628E−06 | 3.1736E−08 |
| S6 | 4.5554E+00 | −5.1446E−04 | 1.4524E−05 | −6.4425E−07 | 1.5148E−08 |
| S7 | 1.5237E+00 | −2.1773E−03 | 2.3894E−03 | −7.3501E−03 | 1.0175E−02 |
| S8 | 4.5554E+00 | −5.1446E−04 | 1.4624E−05 | −6.4425E−07 | 1.5148E−08 |
| S9 | 2.1287E−01 | 1.7264E−02 | −6.3551E−02 | 2.1153E−01 | −3.9169E−01 |
| S10 | −8.8523E−01 | −8.1997E−03 | 5.8728E−04 | 4.9331E−04 | −4.8817E−04 |

|  | Aspherical coefficient | | | | |
|---|---|---|---|---|---|
|  | A12 | A14 | A16 | A18 | A20 |
| S1 | −1.4839E−09 | 8.9846E−11 | −2.2322E−12 | 2.7731E−14 | −1.4051E−16 |
| S2 | −2.0507E−10 | 1.3745E−12 | −1.4356E−16 | 1.9717E−16 | −2.3403E−18 |

TABLE 2-continued

| | | | | | |
|---|---|---|---|---|---|
| S3 | −4.8642E−10 | 5.0752E−12 | −4.5360E−14 | −3.1427E−16 | 8.4028E−18 |
| S4 | 1.4394E−09 | −3.8641E−11 | 6.2039E−13 | −5.6159E−15 | 2.2171E−17 |
| S5 | −4.8642E−10 | 5.0752E−12 | −4.5360E−14 | −3.1427E−16 | 8.4028E−18 |
| S6 | −2.0507E−10 | 1.3745E−12 | −1.4356E−16 | 1.9717E−16 | −2.3403E−18 |
| S7 | −7.7121E−03 | 3.4667E−03 | −9.1682E−04 | 1.3152E−04 | −7.8709E−06 |
| S8 | −2.0507E−10 | 1.3745E−12 | −1.4356E−16 | 1.9717E−16 | −2.3403E−18 |
| S9 | 4.5433E−01 | −3.3212E−01 | 1.4898E−01 | −3.7462E−02 | 4.0642E−03 |
| S10 | 2.0691E−04 | −5.1756E−05 | 7.7484E−06 | −6.4244E−07 | 2.2733E−08 |

TABLE 3

| | |
|---|---|
| 2ω (°) | 9.02 |
| Fno | 2.50 |
| f (mm) | 33.510 |
| f3 (mm) | −10.049 |
| TTL (mm) | 6.063 |
| LB (mm) | 0.930 |
| IH (mm) | 2.619 |

The following Table 19 shows the corresponding values of the parameters defined in the conditions (1) to (9) of the first to sixth embodiments.

The first embodiment satisfies the conditions (1) to (9), as shown in Table 19.

Figure 2:
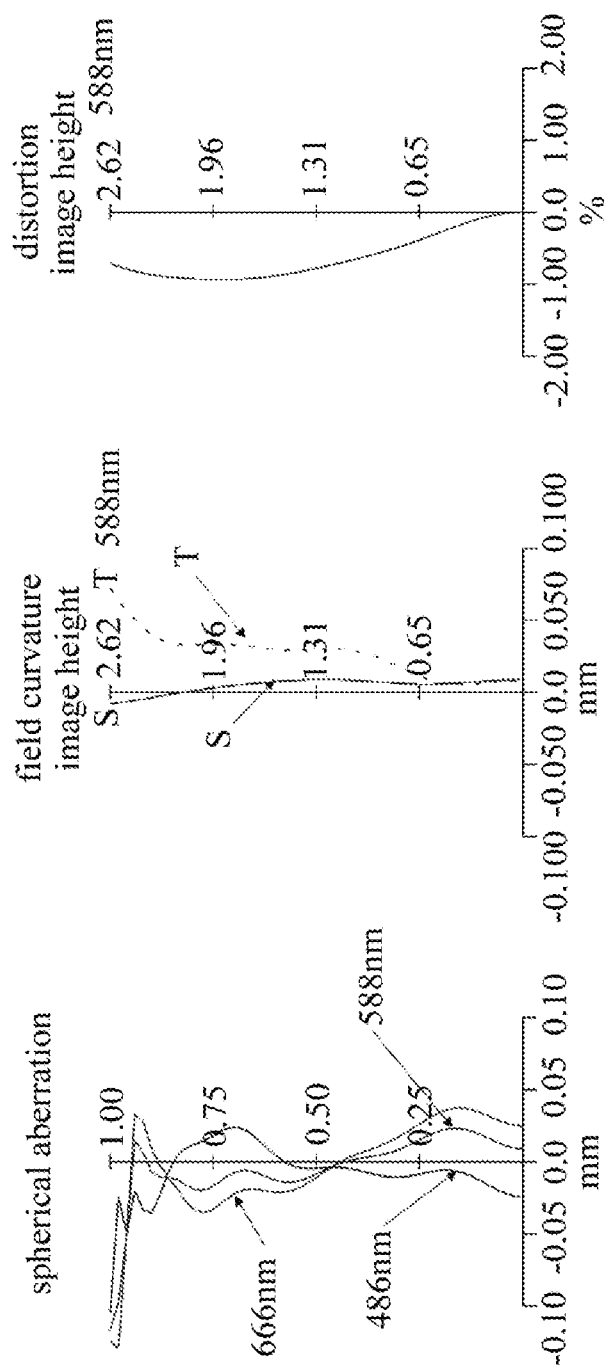
FIG. 2 is diagrams of a spherical aberration, a field curvature, a distortion of the camera lens LA according to the first embodiment of the present invention.

FIG. 2 illustrates a spherical aberration, a field curvature, and a distortion of the camera lens LA of the catadioptric optical system according to the first embodiment. In addition, in FIG. 2, S is a field curvature for a sagittal image plane, and T is a field curvature for a meridional image plane, which are the same for the second to sixth embodiments. As shown in FIG. 2, the camera lens LA of the catadioptric optical system according to the first embodiment has 2ω=9.02°, the narrow-angle and small height, i.e., TTL/f=0.19, and good optical properties.

Second Embodiment

Figure 3:
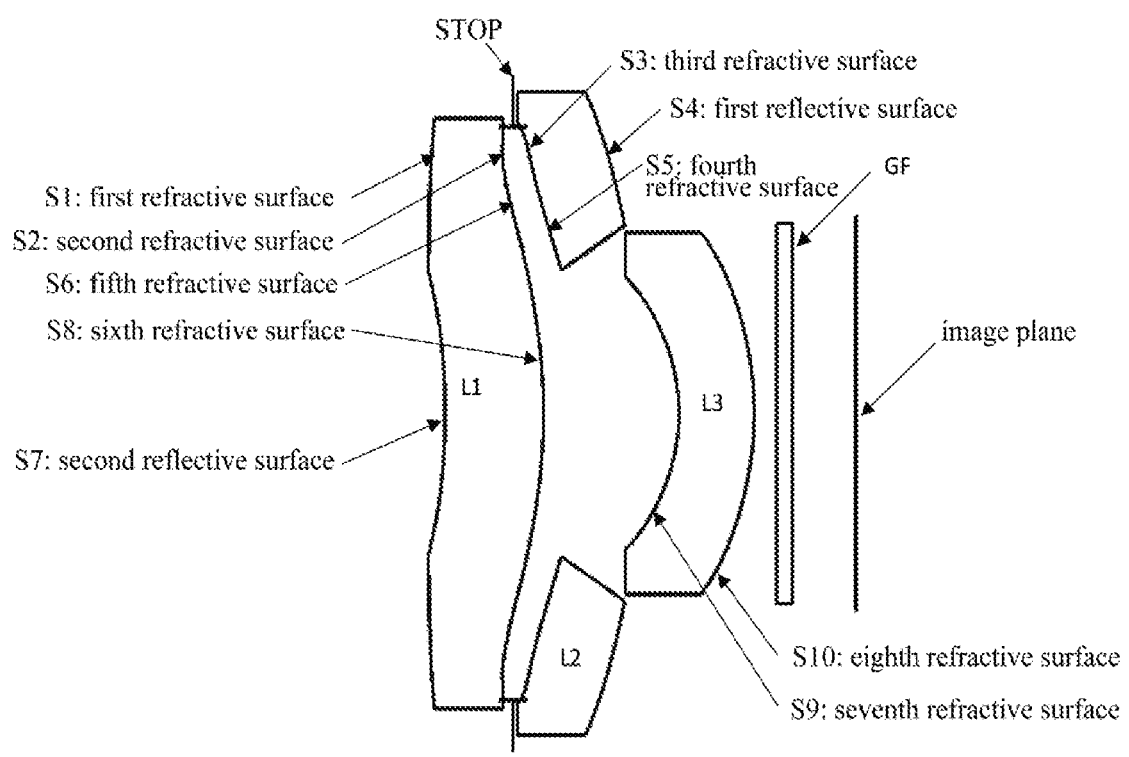
FIG. 3 is a schematic diagram of a camera lens LA according to a second embodiment of the present invention.

FIG. 3 is a schematic diagram of a camera lens LA of a catadioptric optical system according to a second embodiment of the present invention. The curvature radiuses R of the reflective surfaces and refractive surfaces of the first lens assembly L1 to the glass plate GF of the camera lens LA of the catadioptric optical system according to the second embodiment, the center thicknesses of the lenses, or distances d between the lenses, refractive indexes nd, Abbe numbers v are shown in Table 4; conic coefficients k and aspheric coefficients are shown in Table 5; and 2ω, Fno, f, f3, TTL, LB, and IH are shown in Table 6.

TABLE 4

| | | R | | d | | nd | | vd | Effective radius (mm) |
|---|---|---|---|---|---|---|---|---|---|
| S1 | R1 | 20.96099 | d1 | 1.583 | nd1 | 1.5831 | v1 | 59.39 | 3.367 |
| S2 | R2 | −5.77066 | d2 | −0.401 | | | | | 3.247 |
| STOP | | ∞ | d3 | 0.928 | | | | | 3.207 |
| S3 | R3 | −4.16758 | d4 | 0.800 | nd2 | 1.5831 | v2 | 59.39 | 3.215 |
| S4 | R4 | −8.97747 | d5 | −0.800 | | | | | 3.511 |
| S5 | R5 | −4.16758 | d6 | −0.526 | | | | | 3.500 |
| S6 | R6 | −5.77066 | d7 | −1.306 | nd1 | 1.5831 | v1 | 59.39 | 2.548 |
| S7 | R7 | −6.31321 | d8 | 1.306 | | | | | 1.600 |
| S8 | R8 | −5.77066 | d9 | 1.800 | | | | | 1.764 |
| S9 | R9 | −1.80683 | d10 | 1.000 | nd3 | 1.6895 | v3 | 31.02 | 1.530 |
| S10 | R10 | −3.15496 | d11 | 0.300 | | | | | 1.988 |
| S11 | R11 | ∞ | d12 | 0.210 | ndg | 1.5168 | vg | 64.17 | 2.084 |
| S12 | R12 | ∞ | d13 | 0.831 | | | | | 2.098 |

Reference wavelength = 588 nm

TABLE 5

| | Conic coefficient | Aspherical coefficient | | | |
|---|---|---|---|---|---|
| | k | A4 | A6 | A8 | A10 |
| S1 | 0.0000E+00 | −2.3128E−03 | 9.9785E−04 | −7.0812E−04 | 2.6363E−04 |
| S2 | 0.0000E+00 | −3.9668E−03 | 4.8032E−03 | −2.0838E−03 | 5.5695E−04 |
| S3 | 0.0000E+00 | −4.6453E−03 | 8.7778E−03 | −3.8315E−03 | 1.0587E−03 |
| S4 | 0.0000E+00 | −9.5305E−04 | 8.3228E−04 | −2.8648E−04 | 5.9660E−05 |
| S5 | 0.0000E+00 | −4.6453E−03 | 8.7778E−03 | −3.8315E−03 | 1.0587E−03 |
| S6 | 0.0000E+00 | −3.9668E−03 | 4.8032E−03 | −2.0838E−03 | 5.5695E−04 |
| S7 | 0.0000E+00 | −3.5413E−03 | −4.8703E−03 | 1.2298E−02 | −1.4883E−02 |
| S8 | 0.0000E+00 | −3.9668E−03 | 4.8032E−03 | −2.0838E−03 | 5.5695E−04 |
| S9 | 0.0000E+00 | 2.0491E−02 | 5.1013E−03 | −2.1763E−02 | 4.4750E−02 |
| S10 | 0.0000E+00 | 9.5160E−03 | −7.9827E−03 | 1.2157E−02 | −1.2669E−02 |

TABLE 5-continued

| | Aspherical coefficient | | | | |
|---|---|---|---|---|---|
| | A12 | A14 | A16 | A18 | A20 |
| S1 | −5.9215E−05 | 8.1919E−06 | −6.7009E−07 | 2.9554E−08 | −5.4158E−10 |
| S2 | −9.3398E−05 | 9.7226E−06 | −5.7624E−07 | 1.6297E−08 | −1.3571E−10 |
| S3 | −1.9435E−04 | 2.3844E−05 | −1.8738E−06 | 8.5091E−08 | −1.7036E−09 |
| S4 | −8.2388E−06 | 7.6130E−07 | −4.5420E−08 | 1.5734E−09 | −2.3925E−11 |
| S5 | −1.9435E−04 | 2.3844E−05 | −1.8738E−06 | 8.5091E−08 | −1.7036E−09 |
| S6 | −9.3398E−05 | 9.7226E−06 | −5.7624E−07 | 1.6297E−08 | −1.3571E−10 |
| S7 | 1.0776E−02 | −4.8282E−03 | 1.3060E−03 | −1.9503E−04 | 1.2360E−05 |
| S8 | −9.3398E−05 | 9.3226E−06 | −5.7624E−07 | 1.6297E−08 | −1.3571E−10 |
| S9 | −6.0494E−02 | 4.7011E−02 | −2.1880E−02 | 5.5649E−02 | −5.9124E−04 |
| S10 | 7.9079E−03 | −2.9855E−03 | 6.6168E−04 | −7.8531E−05 | 3.8092E−06 |

TABLE 6

| 2ω (°) | 18.61 |
|---|---|
| Fno | 1.90 |
| f (mm) | 12.359 |
| f3 (mm) | −8.796 |
| TTL (mm) | 5.447 |
| LB (mm) | 1.341 |
| IH (mm) | 2.056 |

As shown in Table 19, the second embodiment satisfies the conditions (1) to (9).

Figure 4:
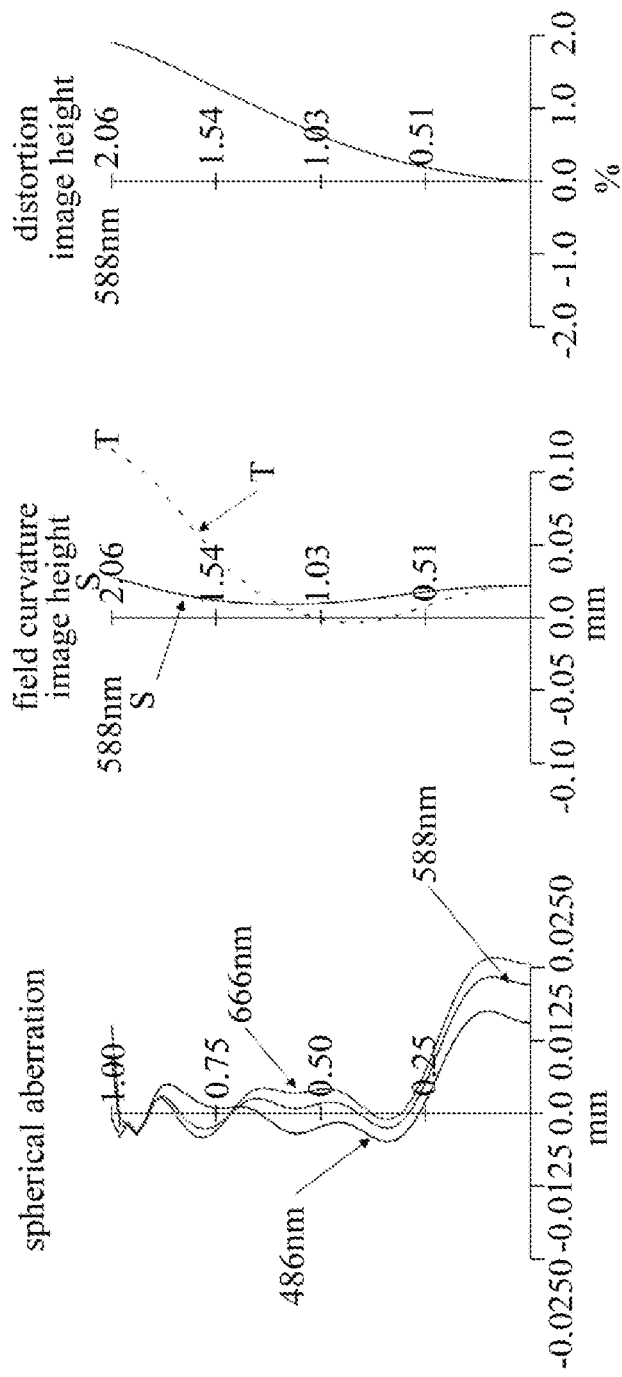
FIG. 4 is diagrams of a spherical aberration, a field curvature, a distortion of the camera lens LA according to the second embodiment of the present invention.

FIG. 4 illustrates a spherical aberration, a field curvature, and a distortion of the camera lens LA of the catadioptric optical system according to the second embodiment. As shown in FIG. 4, the camera lens LA of the catadioptric optical system according to the second embodiment has $2\omega=18.61°$, the wide-angle and small height, i.e., TTL/f=0.46, and good optical properties.

Third Embodiment

Figure 5:
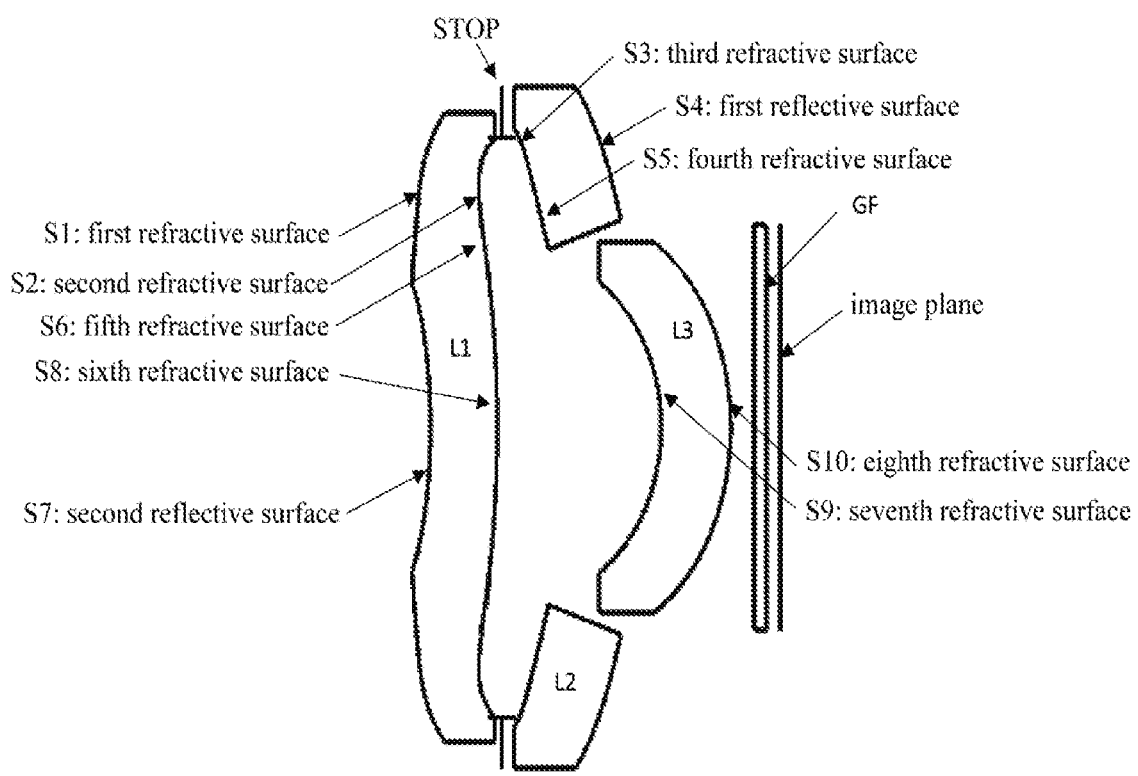
FIG. 5 is a schematic diagram of a camera lens LA according to a third embodiment of the present invention.

FIG. 5 is a schematic diagram of a camera lens LA of a catadioptric optical system according to a third embodiment of the present invention. The curvature radiuses R of the reflective surfaces and refractive surfaces of the first lens assembly L1 to the glass plate GF of the camera lens LA of the catadioptric optical system according to the third embodiment, the center thicknesses of the lenses, or distances d between the lenses, refractive indexes nd, Abbe numbers v are shown in Table 7; conic coefficients k and aspheric coefficients are shown in Table 8; and 2ω, Fno, f, f3, TTL, LB, and IH are shown in Table 9.

TABLE 7

| | | R | | d | | nd | | vd | Effective radius (mm) |
|---|---|---|---|---|---|---|---|---|---|
| S1 | R1 | 17.03529 | d1 | 1.499 | nd1 | 1.5831 | v1 | 59.39 | 4.250 |
| S2 | R2 | −16.34165 | d2 | 0.076 | | | | | 3.918 |
| STOP | | ∞ | d3 | 1.155 | | | | | 3.913 |
| S3 | R3 | −6.88423 | d4 | 1.167 | nd2 | 1.5831 | v2 | 59.39 | 4.050 |
| S4 | R4 | −11.28599 | d5 | −1.167 | | | | | 4.600 |
| S5 | R5 | −6.88423 | d6 | −1.231 | | | | | 4.050 |
| S6 | R6 | −16.34165 | d7 | −1.108 | nd1 | 1.5831 | v1 | 59.39 | 2.694 |
| S7 | R7 | −8.17110 | d8 | 1.108 | | | | | 1.930 |
| S8 | R8 | −16.34165 | d9 | 2.719 | | | | | 1.959 |
| S9 | R9 | −2.34702 | d10 | 1.152 | nd3 | 1.6889 | v3 | 31.16 | 1.970 |
| S10 | R10 | −3.14398 | d11 | 0.382 | | | | | 2.500 |
| S11 | R11 | ∞ | d12 | 0.210 | ndg | 1.5168 | vg | 64.17 | 2.720 |
| S12 | R12 | ∞ | d13 | 0.235 | | | | | 2.732 |

Reference wavelength = 588 nm

TABLE 8

| | Conic coefficient | Aspherical coefficient | | | |
|---|---|---|---|---|---|
| | k | A4 | A6 | A8 | A10 |
| S1 | 0.0000E+00 | −1.7768E−03 | 3.6557E−04 | −1.2275E−04 | 2.6541E−05 |
| S2 | 0.0000E+00 | −3.6940E−03 | 1.5052E−03 | −3.8254E−04 | 6.2797E−05 |
| S3 | 0.0000E+00 | −2.8466E−03 | 2.5549E−03 | −7.0037E−04 | 1.1943E−04 |
| S4 | 0.0000E+00 | −3.9918E−04 | 2.4547E−04 | −5.3237E−05 | 6.7331E−06 |
| S5 | 0.0000E+00 | −2.8466E−03 | 2.5549E−03 | −7.0037E−04 | 1.1943E−04 |
| S6 | 0.0000E+00 | −3.6940E−03 | 1.5052E−03 | −3.8254E−04 | 6.2797E−05 |
| S7 | 0.0000E+00 | −4.0883E−03 | 8.3523E−04 | −2.2023E−03 | 3.0374E−03 |
| S8 | 0.0000E+00 | −3.6940E−03 | 1.5052E−03 | −3.8254E−04 | 6.2797E−05 |
| S9 | 0.0000E+00 | 1.2449E−02 | −1.3765E−02 | 1.5168E−02 | −1.3212E−02 |
| S10 | 0.0000E+00 | 1.4513E−02 | −1.4654E−02 | 1.0589E−02 | −5.6628E−03 |

TABLE 8-continued

| | Aspherical coefficient | | | | |
|---|---|---|---|---|---|
| | A12 | A14 | A16 | A18 | A20 |
| S1 | −3.6284E−06 | 3.1446E−07 | −1.6195E−08 | 4.4886E−10 | −5.1551E−12 |
| S2 | −6.4839E−06 | 4.1650E−07 | −1.5174E−08 | 2.6307E−10 | −1.2449E−12 |
| S3 | −1.3521E−05 | 1.0199E−06 | −4.9337E−08 | 1.3856E−09 | −1.7242E−11 |
| S4 | −5.7194E−07 | 3.2624E−08 | −1.1974E−09 | 2.5378E−11 | −2.3548E−13 |
| S5 | −1.3521E−05 | 1.0199E−06 | −4.9337E−08 | 1.3856E−09 | −1.7242E−11 |
| S6 | −6.4839E−06 | 4.1650E−07 | −1.5174E−08 | 2.6307E−10 | −1.2449E−12 |
| S7 | −2.3808E−03 | 1.1032E−03 | −3.0360E−04 | 4.6046E−05 | −2.9773E−06 |
| S8 | −6.4839E−06 | 4.1650E−07 | −1.5174E−08 | 2.6307E−10 | −1.2449E−12 |
| S9 | 7.7252E−03 | −2.8756E−03 | 6.5513E−04 | −8.3411E−05 | 4.5547E−06 |
| S10 | 2.0070E−03 | −4.5233E−04 | 6.2227E−05 | −4.7643E−03 | 1.5560E−07 |

TABLE 9

| 2ω (°) | 18.56 |
|---|---|
| Fno | 1.92 |
| f (mm) | 15.728 |
| f3 (mm) | −32.349 |
| TTL (mm) | 5.805 |
| LB (mm) | 0.827 |
| IH (mm) | 2.619 |

As shown in Table 19, the third embodiment satisfies the conditions (1) to (9).

Figure 6:
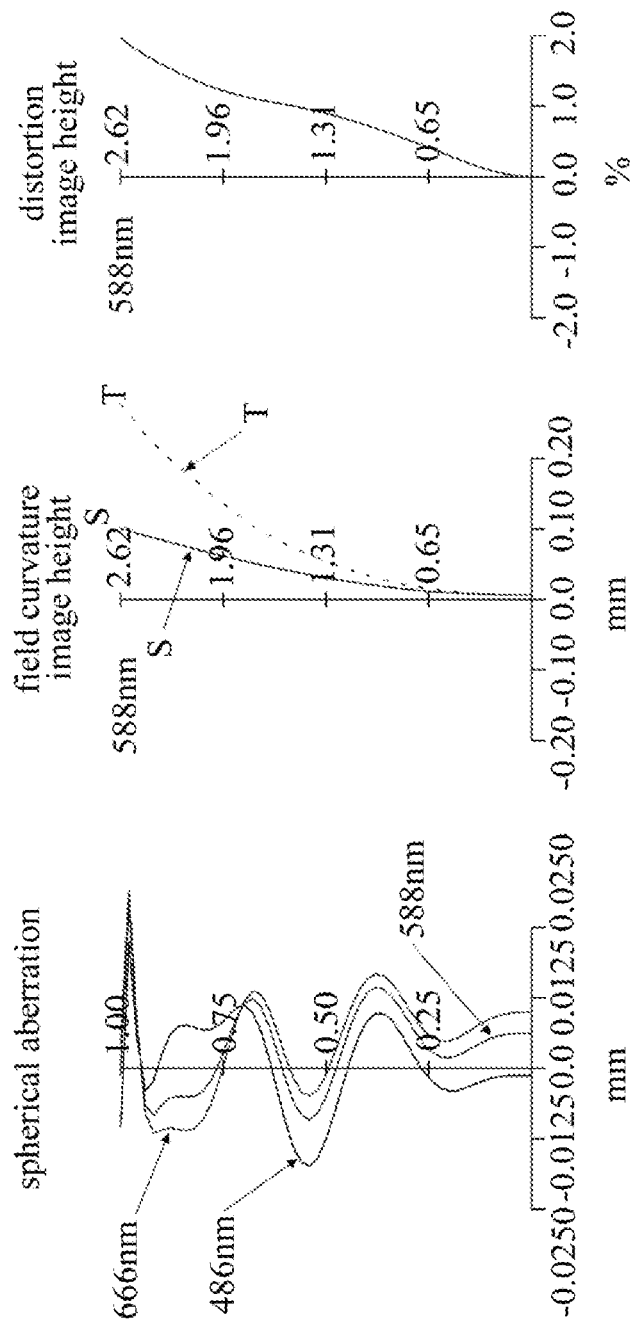
FIG. 6 is diagrams of a spherical aberration, a field curvature, a distortion of the camera lens LA according to the third embodiment of the present invention.

FIG. 6 illustrates a spherical aberration, a field curvature, and a distortion of the camera lens LA of the catadioptric optical system according to the third embodiment. As shown in FIG. 6, the camera lens LA of the catadioptric optical system according to the third embodiment has $2\omega=18.56°$, the wide-angle and small height, i.e., TTL/f=0.39, and good optical properties.

Fourth Embodiment

Figure 7:
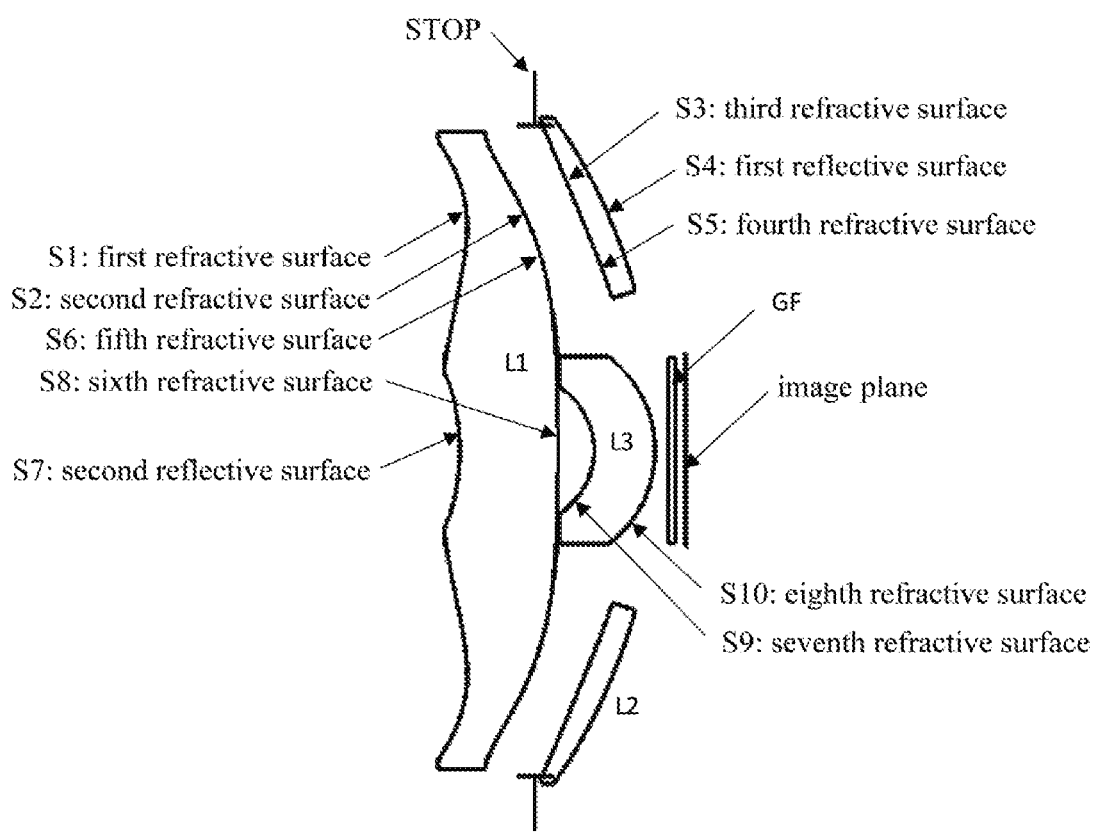
FIG. 7 is a schematic diagram of a camera lens LA according to a fourth embodiment of the present invention.

FIG. 7 is a schematic diagram of a camera lens LA of a catadioptric optical system according to a fourth embodiment of the present invention. The curvature radiuses R of the reflective surfaces and refractive surfaces of the first lens assembly L1 to the glass plate GF of the camera lens LA of the catadioptric optical system according to the fourth embodiment, the center thicknesses of the lenses, or distances d between the lenses, refractive indexes nd, Abbe numbers v are shown in Table 10; conic coefficients k and aspheric coefficients are shown in Table 11; and 2ω, Fno, f, f3, TTL, LB, and IH are shown in Table 12.

TABLE 10

| | | R | | d | | nd | | vd | Effective radius (mm) |
|---|---|---|---|---|---|---|---|---|---|
| S1 | R1 | 14.13925 | d1 | 3.582 | nd1 | 1.5163 | v1 | 64.07 | 8.748 |
| S2 | R2 | −113.46600 | d2 | −0.678 | | | | | 8.975 |
| STOP | | ∞ | d3 | 3.102 | | | | | 9.175 |
| S3 | R3 | −11.64041 | d4 | 0.557 | nd2 | 1.5806 | v2 | 60.08 | 9.251 |
| S4 | R4 | −15.35171 | d5 | −0.557 | | | | | 9.348 |
| S5 | R5 | −11.64041 | d6 | −2.424 | | | | | 8.977 |
| S6 | R6 | −113.46600 | d7 | −2.937 | nd1 | 1.5163 | v1 | 64.07 | 6.208 |
| S7 | R7 | −6.38482 | d8 | 2.937 | | | | | 2.220 |
| S8 | R8 | −113.46600 | d9 | 1.087 | | | | | 1.826 |
| S9 | R9 | −1.96544 | d10 | 1.814 | nd3 | 1.9019 | v3 | 25.10 | 1.790 |
| S10 | R10 | −3.37331 | d11 | 0.400 | | | | | 2.646 |
| S11 | R11 | ∞ | d12 | 0.210 | ndg | 1.5168 | vg | 64.17 | 2.596 |
| S12 | R12 | ∞ | d13 | 0.317 | | | | | 2.599 |

Reference wavelength = 588 nm

TABLE 11

| | Conic coefficient | Aspherical coefficient | | | |
|---|---|---|---|---|---|
| | k | A4 | A6 | A8 | A10 |
| S1 | −2.4609E+00 | −2.0556E−04 | 5.4159E−06 | −3.1402E−07 | 5.1450E−09 |
| S2 | 5.5497E+00 | −6.2857E−04 | 2.3560E−05 | −1.1453E−06 | 3.0617E−08 |
| S3 | −6.3440E−02 | −2.1679E−04 | 3.8644E−05 | −2.0355E−06 | 6.3577E−08 |
| S4 | 1.4348E−02 | −4.2113E−05 | 8.1592E−06 | −4.1180E−07 | 1.1565E−08 |
| S5 | −6.3440E−02 | −2.1679E−04 | 3.8644E−05 | −2.0355E−06 | 6.3577E−08 |
| S6 | 5.5497E+00 | −6.2857E−04 | 2.3560E−05 | −1.1453E−06 | 3.0617E−08 |
| S7 | 2.1853E+00 | 2.3335E−05 | −3.8222E−03 | 5.0183E−03 | −4.1378E−03 |
| S8 | 5.5497E+00 | −6.2857E−04 | 2.3560E−05 | −1.1453E−06 | 3.0617E−08 |
| S9 | −5.0079E−01 | −9.7894E−03 | 1.9765E−02 | −4.8013E−02 | 6.1995E−02 |
| S10 | −6.8872E−01 | −8.7807E−03 | 4.3033E−03 | −4.1021E−03 | 2.4239E−03 |

TABLE 11-continued

| | Aspherical coefficient | | | | |
|---|---|---|---|---|---|
| | A12 | A14 | A16 | A18 | A20 |
| S1 | −1.1266E−10 | 2.7914E−12 | −3.8910E−14 | 2.6575E−16 | −6.9802E−19 |
| S2 | −4.7132E−10 | 4.2594E−12 | −2.0805E−14 | 4.3673E−17 | −4.4595E−22 |
| S3 | −1.2056E−09 | 1.4196E−11 | −1.0226E−13 | 4.1505E−16 | −7.2975E−19 |
| S4 | −2.0602E−10 | 2.4124E−12 | −1.8102E−14 | 7.8766E−17 | −1.5096E−19 |
| S5 | −1.2056E−09 | 1.4196E−11 | −1.0226E−13 | 4.1505E−16 | −7.2975E−19 |
| S6 | −4.7132E−10 | 4.2594E−12 | −2.0805E−14 | 4.3673E−17 | −4.4595E−22 |
| S7 | 2.1293E−03 | −6.8904E−04 | 1.3607E−04 | −1.4957E−05 | 7.0111E−07 |
| S8 | −4.7132E−10 | 4.2594E−12 | −2.0805E−14 | 4.3673E−17 | −4.4595E−22 |
| S9 | −4.9202E−02 | 2.4380E−02 | −7.3413E−03 | 1.2266E−03 | −8.7080E−05 |
| S10 | −8.8453E−04 | 2.0066E−04 | −2.7549E−05 | 2.0921E−06 | −6.7357E−08 |

TABLE 12

| | |
|---|---|
| 2ω (°) | 9.14 |
| Fno | 1.95 |
| f (mm) | 33.534 |
| f3 (mm) | −13.427 |
| TTL (mm) | 6.765 |
| LB (mm) | 0.927 |
| IH (mm) | 2.619 |

As shown in Table 19, the fourth embodiment satisfies the conditions (1) to (9).

Figure 8:
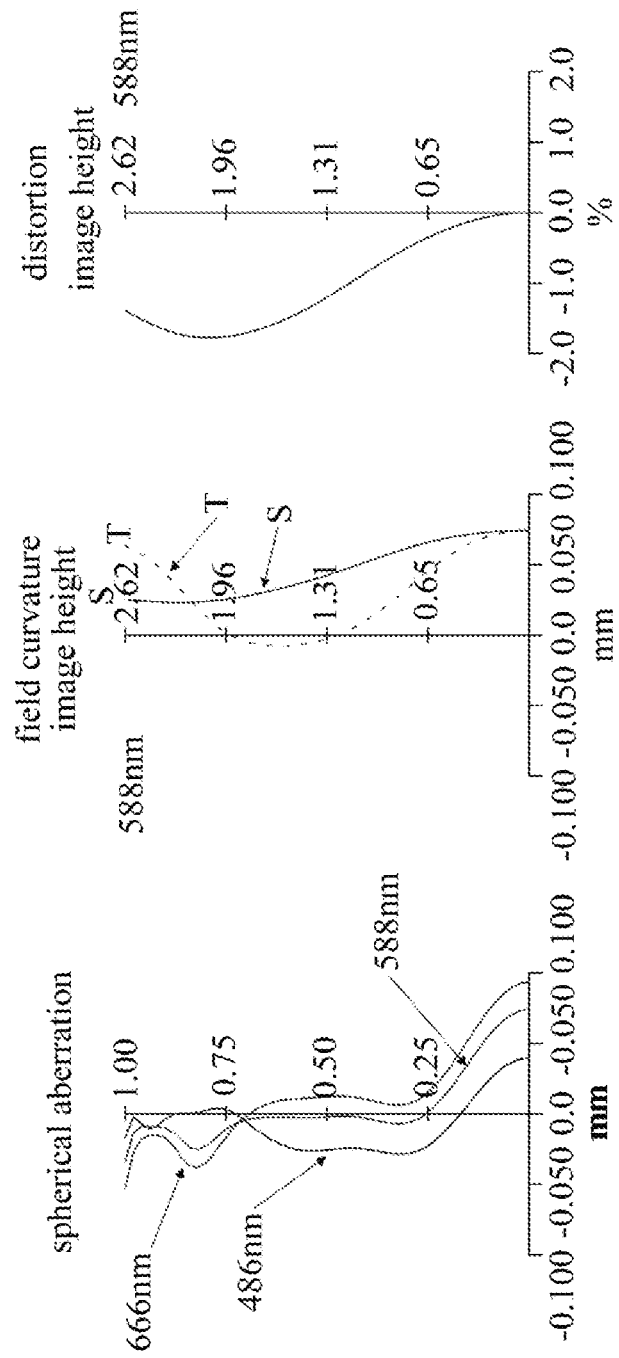
FIG. 8 is diagrams of a spherical aberration, a field curvature, a distortion of the camera lens LA according to the fourth embodiment of the present invention.

FIG. 8 illustrates a spherical aberration, a field curvature, and a distortion of the camera lens LA of the catadioptric optical system according to the fourth embodiment. As shown in FIG. 8, the camera lens LA of the catadioptric optical system according to the fourth embodiment has $2\omega=9.14°$, the wide-angle and small height, i.e., TTL/f=0.21, and good optical properties.

Fifth Embodiment

Figure 9:
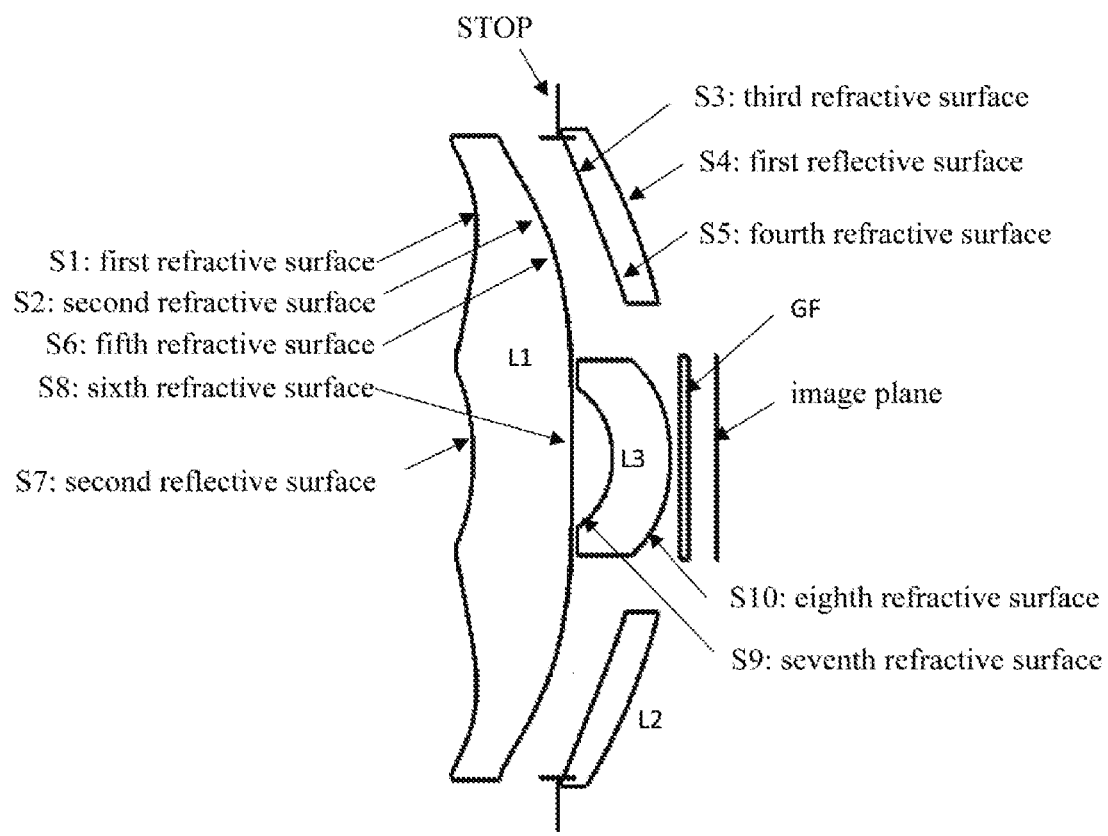
FIG. 9 is a schematic diagram of a camera lens LA according to a fifth embodiment of the present invention.

FIG. 9 is a schematic diagram of a camera lens LA of a catadioptric optical system according to a fifth embodiment of the present invention. The curvature radiuses R of the reflective surfaces and refractive surfaces of the first lens assembly L1 to the glass plate GF of the camera lens LA of the catadioptric optical system according to the fifth embodiment, the center thicknesses of the lenses, or distances d between the lenses, refractive indexes nd, Abbe numbers v are shown in Table 13; conic coefficients k and aspheric coefficients are shown in Table 14; and 2ω, Fno, f, f3, TTL, LB, and IH are shown in Table 15.

TABLE 13

| | | R | | d | | nd | | vd | Effective radius (mm) |
|---|---|---|---|---|---|---|---|---|---|
| S1 | R1 | 11.42342 | d1 | 2.733 | nd1 | 1.5163 | v1 | 64.07 | 6.539 |
| S2 | R2 | −89.64793 | d2 | −0.326 | | | | | 6.672 |
| STOP | | ∞ | d3 | 2.089 | | | | | 6.641 |
| S3 | R3 | −9.05885 | d4 | 0.596 | nd2 | 1.5806 | v2 | 60.08 | 6.700 |
| S4 | R4 | −11.88089 | d5 | −0.596 | | | | | 6.817 |
| S5 | R5 | −9.05885 | d6 | −1.763 | | | | | 6.700 |
| S6 | R6 | −89.64793 | d7 | −2.206 | nd1 | 1.5163 | v1 | 64.07 | 4.503 |
| S7 | R7 | −5.20986 | d8 | 2.206 | | | | | 1.823 |
| S8 | R8 | −89.64793 | d9 | 0.900 | | | | | 1.519 |
| S9 | R9 | −1.80816 | d10 | 1.288 | nd3 | 1.9019 | v3 | 25.10 | 1.422 |
| S10 | R10 | −3.49686 | d11 | 0.199 | | | | | 2.005 |
| S11 | R11 | ∞ | d12 | 0.210 | ndg | 1.5168 | vg | 64.17 | 2.069 |
| S12 | R12 | ∞ | d13 | 0.620 | | | | | 2.078 |

Reference wavelength = 588 nm

TABLE 14

| | Conic coefficient | Aspherical coefficient | | | |
|---|---|---|---|---|---|
| | k | A4 | A6 | A8 | A10 |
| S1 | −1.5290E+00 | −6.2901E−04 | 3.4168E−05 | −3.4702E−06 | 1.4835E−07 |
| S2 | 3.0000E+01 | −1.4427E−03 | 1.0034E−04 | −8.6991E−06 | 4.1404E−07 |
| S3 | −3.9920E−02 | −5.2361E−04 | 1.6401E−04 | −1.5444E−05 | 8.6025E−07 |
| S4 | −2.5868E−02 | −9.4519E−05 | 3.2085E−05 | −2.7875E−06 | 1.3755E−07 |
| S5 | −3.9920E−02 | −5.2361E−04 | 1.6401E−04 | −1.5444E−05 | 8.6025E−07 |
| S6 | 3.0000E+01 | −1.4427E−03 | 1.0034E−04 | −8.6991E−06 | 4.1404E−07 |
| S7 | 1.5200E+00 | −2.8110E−03 | −1.1434E−03 | 2.0087E−03 | −2.6024E−03 |
| S8 | 3.0000E+01 | −1.4427E−03 | 1.0034E−04 | −8.6991E−06 | 4.1404E−07 |
| S9 | −3.1031E−01 | −2.6792E−02 | 6.2940E−02 | −2.1601E−01 | 4.0099E−01 |
| S10 | −5.8300E−01 | −1.6255E−02 | −8.2956E−04 | 2.6795E−03 | −3.0682E−03 |

TABLE 14-continued

| | Aspherical coefficient | | | | |
|---|---|---|---|---|---|
| | A12 | A14 | A16 | A18 | A20 |
| S1 | −5.4920E−09 | 1.6169E−10 | −3.0181E−12 | 3.1415E−14 | −1.3973E−16 |
| S2 | −1.1381E−08 | 1.8342E−10 | −1.5993E−12 | 5.9711E−15 | 2.2069E−19 |
| S3 | −2.9107E−08 | 6.1144E−10 | −7.8567E−12 | 5.6898E−14 | −1.7843E−16 |
| S4 | −4.3225E−09 | 8.8522E−11 | −1.1437E−12 | 8.4098E−15 | −2.6630E−17 |
| S5 | −2.9107E−08 | 6.1144E−10 | −7.8567E−12 | 5.6898E−14 | −1.7843E−16 |
| S6 | −1.1381E−08 | 1.8342E−10 | −1.5993E−12 | 5.9711E−15 | 2.2069E−19 |
| S7 | 2.0089E−03 | −9.8937E−04 | 3.0362E−04 | −5.2055E−05 | 3.7892E−06 |
| S8 | −1.1381E−08 | 1.8342E−10 | −1.5993E−12 | 5.9711E−15 | 2.2069E−19 |
| S9 | −4.5390E−01 | 3.1688E−01 | −1.3275E−01 | 3.0474E−02 | −2.9338E−03 |
| S10 | 2.0902E−03 | −8.7099E−04 | 2.1654E−04 | −2.9477E−05 | 1.6888E−06 |

TABLE 15

| 2ω (°) | 9.33 |
|---|---|
| Fno | 1.95 |
| f (mm) | 24.905 |
| f3 (mm) | −6.505 |
| TTL (mm) | 5.423 |
| LB (mm) | 1.029 |
| IH (mm) | 2.040 |

As shown in Table 19, the fourth embodiment satisfies the conditions (1) to (9).

Figure 10:
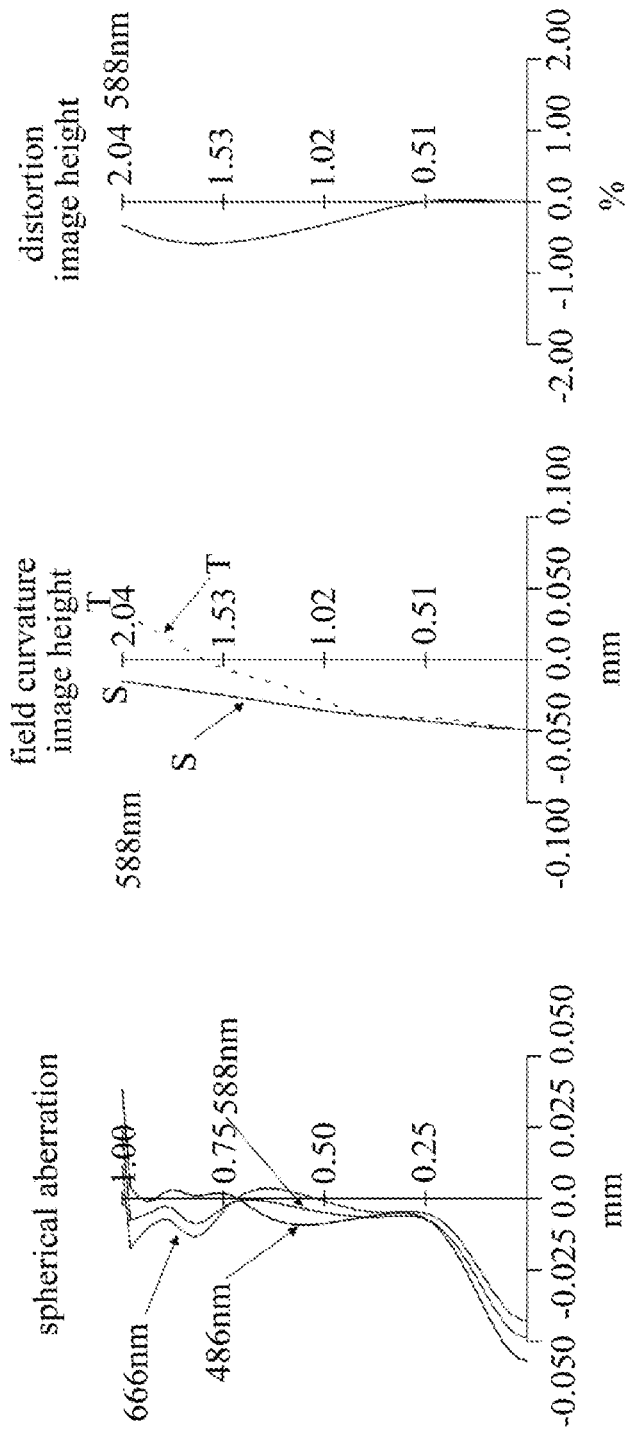
FIG. 10 is diagrams of a spherical aberration, a field curvature, a distortion of the camera lens LA according to the fifth embodiment of the present invention.

FIG. 10 illustrates a spherical aberration, a field curvature, and a distortion of the camera lens LA of the catadioptric optical system according to the fifth embodiment. As shown in FIG. 10, the camera lens LA of the catadioptric optical system according to the fifth embodiment has 2ω=9.33°, the wide-angle and small height, i.e., TTL/f=0.23, and good optical properties.

Sixth Embodiment

Figure 11:
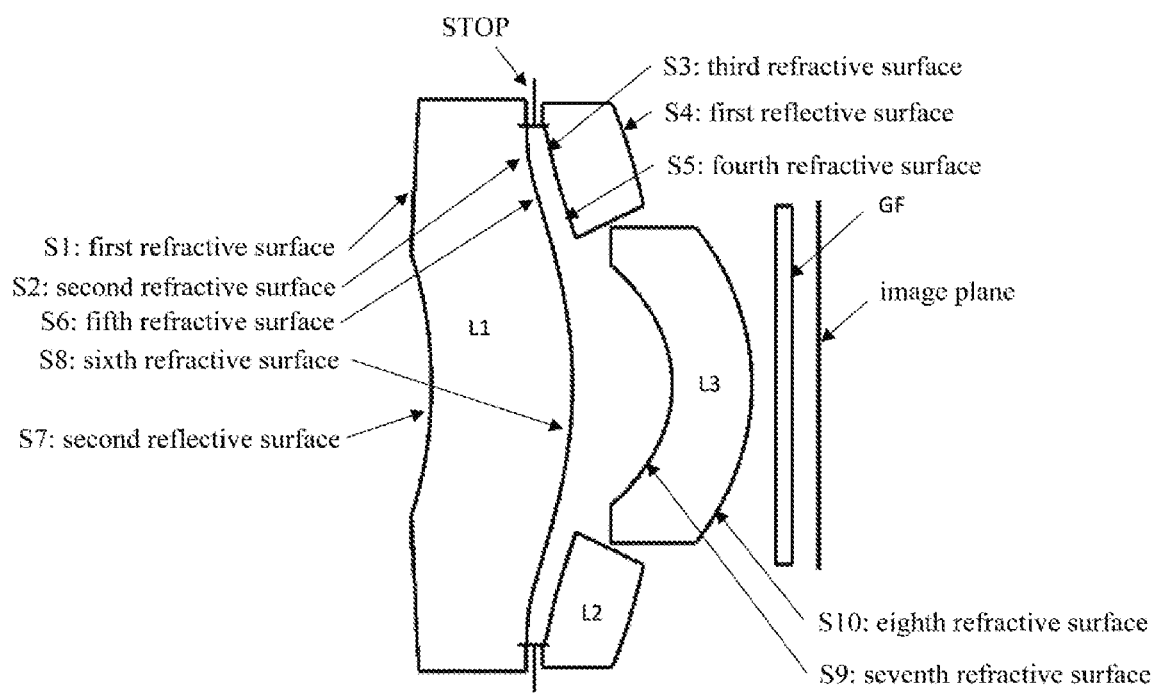
FIG. 11 is a schematic diagram of a camera lens LA according to a sixth embodiment of the present invention.

FIG. 11 is a schematic diagram of a camera lens LA of a catadioptric optical system according to a sixth embodiment of the present invention. The curvature radiuses R of the reflective surfaces and refractive surfaces of the first lens assembly L1 to the glass plate GF of the camera lens LA of the catadioptric optical system according to the sixth embodiment, the center thicknesses of the lenses, or distances d between the lenses, refractive indexes nd, Abbe numbers v are shown in Table 16; conic coefficients k and aspheric coefficients are shown in Table 17; and 2ω, Fno, f, f3, TTL, LB, and IH are shown in Table 18.

TABLE 16

| | | R | | d | | nd | | vd | Effective radius (mm) |
|---|---|---|---|---|---|---|---|---|---|
| S1 | R1 | 19.32950 | d1 | 2.089 | nd1 | 1.5831 | v1 | 59.46 | 3.379 |
| S2 | R2 | −5.53735 | d2 | −0.487 | | | | | 3.205 |
| STOP | | ∞ | d3 | 0.878 | | | | | 3.178 |
| S3 | R3 | −4.26645 | d4 | 0.769 | nd2 | 1.5831 | v2 | 59.46 | 3.200 |
| S4 | R4 | −9.23510 | d5 | −0.769 | | | | | 3.415 |
| S5 | R5 | −4.26645 | d6 | −0.390 | | | | | 3.500 |
| S6 | R6 | −5.53735 | d7 | −1.779 | nd1 | 1.5831 | v1 | 59.46 | 2.596 |
| S7 | R7 | −5.66387 | d8 | 1.779 | | | | | 1.600 |
| S8 | R8 | −5.53735 | d9 | 1.261 | | | | | 1.576 |
| S9 | R9 | −1.52561 | d10 | 1.000 | nd3 | 1.8211 | v3 | 24.06 | 1.470 |
| S10 | R10 | −3.08272 | d11 | 0.300 | | | | | 1.930 |
| S11 | R11 | ∞ | d12 | 0.210 | ndg | 1.5168 | vg | 64.17 | 2.167 |
| S12 | R12 | ∞ | d13 | 0.340 | | | | | 2.194 |

Reference wavelength = 588 nm

TABLE 17

| | Conic coefficient | Aspherical coefficient | | | |
|---|---|---|---|---|---|
| | k | A4 | A6 | A8 | A10 |
| S1 | 0.0000E+00 | −2.1881E−03 | 9.6145E−04 | −5.2523E−04 | 1.5944E−04 |
| S2 | 0.0000E+00 | −4.2695E−03 | 5.3701E−03 | −2.2285E−03 | 5.6058E−04 |
| S3 | 0.0000E+00 | −4.7030E−03 | 8.7957E−03 | −3.8302E−03 | 1.0587E−03 |
| S4 | 0.0000E+00 | −8.5027E−04 | 8.3391E−04 | −2.8657E−04 | 5.9657E−05 |
| S5 | 0.0000E+00 | −4.7030E−03 | 8.7957E−03 | −3.8302E−03 | 1.0587E−03 |
| S6 | 0.0000E+00 | −4.2695E−03 | 5.3701E−03 | −2.2285E−03 | 5.6058E−04 |
| S7 | 0.0000E+00 | −9.2710E−03 | 1.7012E−02 | −3.0586E−02 | 3.5186E−02 |
| S8 | 0.0000E+00 | −4.2695E−03 | 5.3701E−03 | −2.2285E−03 | 5.6058E−04 |
| S9 | 0.0000E+00 | 3.3040E−02 | −1.3440E−01 | 5.9317E−01 | −1.2446E+00 |
| S10 | 0.0000E+00 | −2.2710E−02 | 2.2452E−02 | −8.8455E−03 | −3.2092E−03 |

TABLE 17-continued

| | Aspherical coefficient | | | | |
|---|---|---|---|---|---|
| | A12 | A14 | A16 | A18 | A20 |
| S1 | −3.1114E−05 | 3.9617E−06 | −3.1093E−07 | 1.3502E−08 | −2.4743E−10 |
| S2 | −8.9061E−05 | 9.0848E−06 | −5.6653E−07 | 1.9359E−08 | −2.7986E−10 |
| S3 | −1.9436E−04 | 2.3843E−05 | −1.8739E−06 | 8.5087E−08 | −1.7011E−09 |
| S4 | −8.2392E−06 | 7.6141E−07 | −4.5423E−08 | 1.5738E−09 | −2.4001E−11 |
| S5 | −1.9436E−04 | 2.3843E−05 | −1.8739E−06 | 8.5087E−08 | −1.7011E−09 |
| S6 | −8.9061E−05 | 9.0848E−06 | −5.6653E−07 | 1.9359E−08 | −2.7986E−10 |
| S7 | −2.5992E−02 | 1.2246E−02 | −3.5431E−03 | 5.6984E−04 | −3.8488E−05 |
| S8 | −8.9061E−05 | 9.0848E−06 | −5.6653E−07 | 1.9359E−08 | −2.7986E−10 |
| S9 | 1.5393E+00 | −1.1614E+00 | 5.2635E−01 | −1.3167E−01 | 1.4003E−02 |
| S10 | 5.9378E−03 | −3.2581E−03 | 9.2485E−04 | −1.3673E−04 | 8.3311E−06 |

TABLE 18

| 2ω (°) | 18.75 |
|---|---|
| Fno | 1.92 |
| f (mm) | 12.359 |
| f3 (mm) | −5.178 |
| TTL (mm) | 4.890 |
| LB (mm) | 0.850 |
| IH (mm) | 2.056 |

As shown in Table 19, the fourth embodiment satisfies the conditions (1) to (9).

Figure 12:
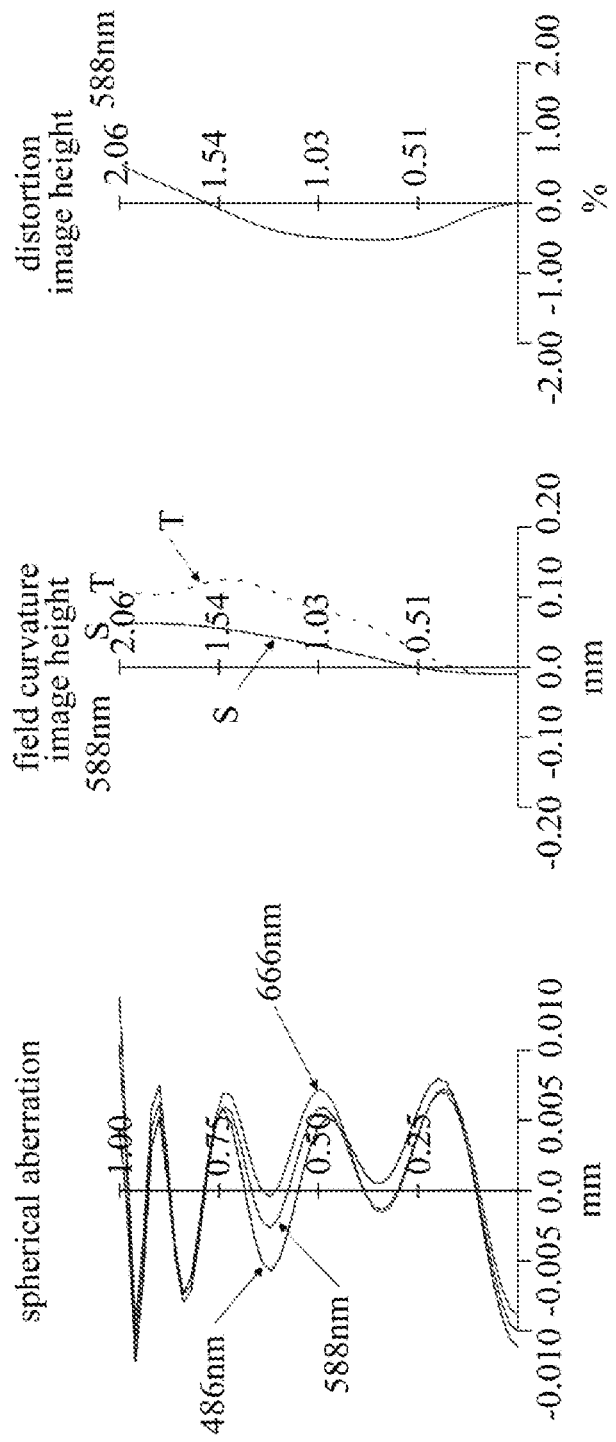
FIG. 12 is diagrams of a spherical aberration, a field curvature, a distortion of the camera lens LA according to the sixth embodiment of the present invention.

FIG. 12 illustrates a spherical aberration, a field curvature, and a distortion of the camera lens LA of the catadioptric optical system according to the sixth embodiment. As shown in FIG. 12, the camera lens LA of the catadioptric optical system according to the sixth embodiment has 2ω=18.75°, the wide-angle and small height, i.e., TTL/f=0.42, and good optical properties.

Table 19 shows the values of the parameter defined in the conditions (1) to (9) of the first to sixth embodiments.

TABLE 19

| | Embodiment 1 | Embodiment 2 | Embodiment 3 | Embodiment 4 | Embodiment 5 | Embodiment 6 | Notes |
|---|---|---|---|---|---|---|---|
| nd3 | 1.902 | 1.689 | 1.689 | 1.902 | 1.902 | 1.821 | condition (1) |
| (v1 + v2)/v3 | 5.801 | 3.828 | 3.916 | 4.948 | 4.946 | 4.943 | condition (2) |
| (|R3| + |R4|)/f | 0.709 | 1.064 | 1.155 | 0.805 | 0.241 | 1.092 | condition (3) |
| (|R7| + |R8|)/f | 1.169 | 0.978 | 1.559 | 3.574 | 3.809 | 0.906 | condition (4) |
| nd3/R9 | −1.119 | −0.235 | −0.720 | −0.968 | −1.052 | −1.194 | condition (5) |
| nd3/R10 | −0.549 | −0.535 | −0.537 | −0.564 | −0.544 | −0.591 | condition (6) |
| TTL/f3 | −0.603 | −0.619 | −0.177 | −0.504 | −0.834 | −0.944 | condition (7) |
| TTL/f | 0.191 | 0.441 | 0.369 | 0.202 | 0.218 | 0.396 | condition (8) |
| TTL/IH | 2.315 | 2.649 | 2.216 | 2.583 | 2.658 | 2.378 | condition (9) |

What is claimed is:

1. A camera lens of a catadioptric optical system, comprising, sequentially from an object side: a first lens assembly having a reflective power and a refractive power, a second lens assembly having a reflective power and a refractive power, and a third lens having a refractive power; wherein an object side surface of the first lens assembly comprises a first refractive surface in a peripheral region thereof and an image side surface of the first lens assembly comprises a second refractive surface in a peripheral region thereof;

an object side surface of the second lens assembly comprises a third refractive surface and a fourth refractive surface that are sequentially arranged from a peripheral region to a central region thereof, and an image side surface of the second lens assembly comprises a first reflective surface;

the object side surface of the first lens assembly further comprises a second reflective surface in a central region thereof, and the image side surface of the first lens assembly further comprises a fifth refractive surface and a sixth refractive surface; the second refractive surface, the fifth refractive surface and the sixth refractive surface are sequentially arranged from a peripheral region to a central region thereof;

the camera lens satisfies following conditions:

$-0.95 \leq TTL/f3 \leq 0.00$, $1.68 \leq nd3 \leq 1.91$; and $3.50 \leq (v1+v2)/v3 \leq 6.00$, where nd3 denotes a refractive index of d line of the third lens;

v1 denotes an abbe number of the first lens assembly;

v2 denotes an abbe number of the second lens assembly; and v3 denotes an abbe number of the third lens;

TTL denotes an optical length indicating an on-axis distance from the second reflective surface to an image plane; and f3 denotes a focal length of the third lens.

2. The camera lens as described in claim 1, further satisfying a following condition:

$$0.70 \leq (|R3|+|R4|)/f \leq 1.20,$$

where f denotes a focal length of the camera lens;

R3 denotes an on-axis curvature radius of the third refractive surface; and

R4 denotes an on-axis curvature radius of the first reflective surface.

3. The camera lens as described in claim 1, further satisfying a following condition:

$$0.90 \leq (|R7|+|R8|)/f \leq 4.00,$$

where f denotes a focal length of the camera lens;

R7 denotes an on-axis curvature radius of the second reflective surface; and

R8 denotes an on-axis curvature radius of the sixth refractive surface.

4. The camera lens as described in claim 1, wherein an object side surface of the third lens L3 includes a seventh refractive surface, and an image side surface of the third lens includes an eighth refractive surface, and the camera lens further satisfies following conditions:

$$-1.20 \leq nd3/R9 \leq -0.70; \text{ and}$$

$$-0.60 \leq nd3/R10 \leq -0.53,$$

where

R9 denotes an on-axis curvature radius of the seventh refractive surface; and

R10 denotes an on-axis curvature radius of the eighth refractive surface.

5. The camera lens as described in claim 1, further satisfying a following condition:

$$0.18 \leq TTL/f \leq 0.45,$$

where f denotes a focal length of the camera lens.

6. The camera lens as described in claim 1, further satisfying a following condition:

$$2.20 \leq TTL/IH \leq 2.70,$$

where

IH denotes a maximum image height.

7. The camera lens as described in claim 1, wherein the first lens assembly, the second lens assembly and the third lens assembly are each made of glass.

* * * * *